April 5, 1955
A. J. RANDALL
2,705,521
TRACTION UNIT FOR PNEUMATIC TIRES
Filed March 9, 1953
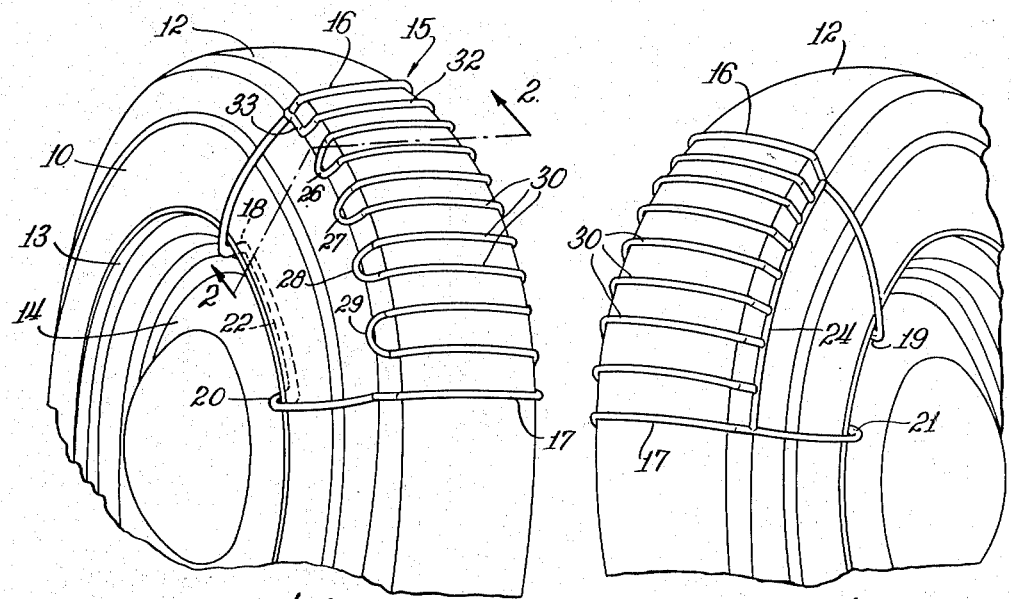
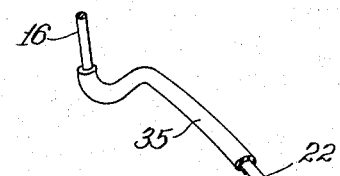
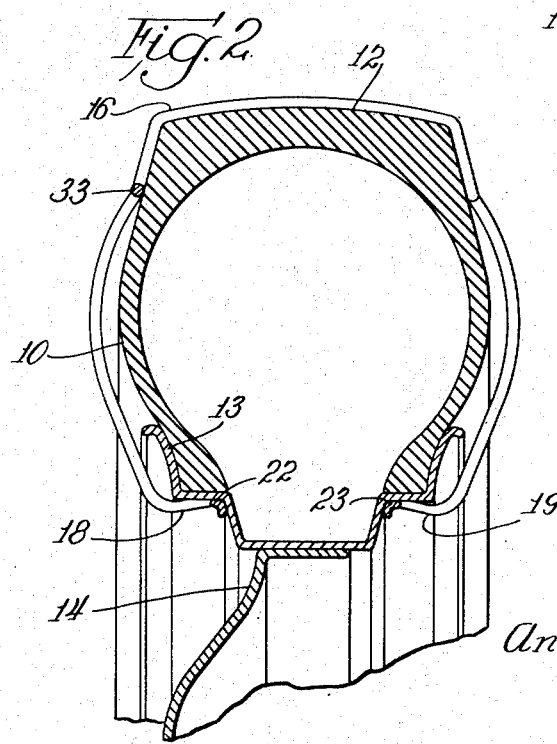
INVENTOR.
Anthony J. Randall
BY
Harry H. Hitzeman
ATTORNEY

United States Patent Office 2,705,521
Patented Apr. 5, 1955

2,705,521

TRACTION UNIT FOR PNEUMATIC TIRES

Anthony J. Randall, Chicago, Ill.

Application March 9, 1953, Serial No. 341,238

4 Claims. (Cl. 152—225)

My invention relates to a traction attachment for pneumatic tires, and more particularly to a resilient unit which can be sprung into position over a tire and will be retained in place on the tire by its own spring force.

It is among the objects of the invention to provide an improved traction or anti-skid attachment for a pneumatic tire which can be conveniently formed of a length of resilient wire or rod and shaped to fit around the portion of an associated tire and provide a traction formation along a portion of a tire tread; which can be sprung onto the tire and will remain in operative position on the tire by its own spring force; which can be mounted in multiple on a tire, if desired, to provide a traction formation substantially around the tire tread; which is of light weight construction and convenient to carry and handle; and which is simple and durable in construction, economical to manufacture, and can be used without damage to the associated tire or wheel.

Other objects and advantages will become apparent from a consideration of the following description and the appended claims in conjunction with the accompanying drawing, wherein:

Fig. 1 is a perspective view of a fragmentary portion of a pneumatic tire and associated wheel with a traction unit illustrative of the invention operatively mounted on the tire and wheel;

Fig. 2 is a transverse cross-sectional view on the line 2—2 of Fig. 1;

Fig. 3 is a perspective view similar to Fig. 1, but showing the opposite side of the tire and attachment from that illustrated in Fig. 1; and Fig. 4 is a perspective view of a fragmentary portion of the traction unit.

With continued reference to the drawing, the numeral 10 indicates a pneumatic tire of well known shape and construction having a peripheral tread portion 12 and mounted at its inner side on the tire supporting rim 13 of an associated vehicle wheel 14.

The traction unit of the invention comprises a structure, generally indicated at 15, formed of suitable rod or wire of resilient material, such as spring steel, and including clamp structures 16 and 17 of U or horseshoe shape, disposed one at each end of the structure, and adapted to fit closely around the associated tire 10. The clamp members 16 and 17 have inwardly offset end portions, as indicated at 18 and 19 for the clamps 16, 20 and 21 for the clamp 17, which end portions are engageable under the tire supporting rim 13 of the associated wheel to secure the structure firmly in position on the associated tire.

A bar 22 interconnects the inwardly offset end portions 18 and 20 of the clamps 16 and 17 at one side of the structure and is flattened, as illustrated in Fig. 2, to fit firmly against the inner side of the tire supporting rim 13. A similar flattened bar 23 interconnects the inwardly offset end portions 19 and 21 of the clamps 16 and 17 respectively at the opposite side of the structure and is also adapted to fit closely under the adjacent annular portion of the rim 13. A bar 24 extends between the clamps 16 and 17 at a location spaced from the bar 23 and disposed adjacent the tread of an associated tire and a plurality of U-shaped or hairpin shaped structures, also formed of wire or rod, and designated at 26 to 29 inclusive, are secured at their open ends to the bar 24 at locations spaced apart along this bar and are positioned to extend transversely across the tread surface 12 of the associated tire 10. These U-shaped members 26 to 29 inclusive are longitudinally curved or bent to fit closely around and bear against the tread portion of the associated tire and provide a plurality of ribs, as indicated at 30, extending transversely across the tire tread at uniformly spaced apart locations around the portion of the tread between the clamps 16 and 17. A single bar 32 is connected to the bar 24 between the member 29 and the clamp 16 and extends parallel to the member 29 along the clamp 16 to a location along this clamp corresponding to the opposite side of the associated tire tread and is there provided with an offset end portion 33 joined to the clamp 16, as illustrated in Fig. 1.

By reason of the resiliency of the wire or rod-like material of which they are formed, the clamps 16 and 17 can be spread to pass over a pneumatic tire and associated wheel rim and will spring together when in position such that the longitudinally curved bars 22 and 23 are disposed at the inner surfaces of the rim at the respectively opposite sides of the rim to hold the bars 22 and 23 in operative engagement with the rim and thereby retain the structure in operative position on the associated tire. The bars 22 and 23 are preferably coated or covered with compressible material, such as rubber, as indicated at 35 in Fig. 4, to protect the finish of the wheel rim from damage by the attachment and the rubber covering or coating preferably extends a sufficient distance along the corresponding legs of the clamps 16 and 17 to prevent any damage to the rim.

The traction units are of light weight construction so that they are easy to handle and to carry and they can be easily applied to an automobile tire by merely snapping them into position over the tire when desired, and can be removed by merely pulling them off of the tire against the spring force of the clamp structures 16 and 17.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What I desire to secure and protect by Letters Patent of the United States is:

1. A traction unit for a pneumatic tire comprising horseshoe shaped spring clamps adapted to embracingly engage an associated tire at spaced apart locations therearound and having inwardly directed portions for engaging under an associated tire carrying rim to support the traction unit, longitudinally curved bars interconnecting the inwardly directed end portions of said clamps at the respectively opposite sides of the unit adapted to bear against the inner surface of said associated rim at respectively opposite sides of the rim, a third bar extending between and joined at its ends to said clamps in spaced and substantially parallel relationship to one of the first mentioned bars, and longitudinally curved ribs secured at corresponding ends to said third bar at uniformly spaced apart locations therealong and extending therefrom in position for extending transversely across and embracingly engage an associated tire tread.

2. A traction unit for use with a pneumatic tire of the type that has a peripheral tread portion and is mounted at its inner side on a tire supporting rim of an associated vehicle wheel, said unit comsists of spaced generally horseshoe shaped spring clamp members for embracingly engaging about the tread and side walls of the tire, bars connecting said clamp members together along both sides of the inner ends of the same, said bar members being arcuate and adapted to be positioned against inner ledges of the tire supporting rim, an arcuately shaped bar connecting said clamp members together at a point adjacent one edge of the tread of said pneumatic tire and transverse parallel ribs connected to said last named bar for extending over the tread of said tire with their opposite ends adapted to engage the opposite side wall of said tire.

3. A traction unit for use with a pneumatic tire of the type that has a peripheral tread portion and is mounted at its inner side on a tire supporting rim of an associated vehicle wheel, said unit consists of spaced generally horseshoe shaped spring clamp members for embracingly engaging about the tread and side walls of the tire, said clamp members having inwardly turned portions at each of their inner ends, bars connecting the inwardly turned portions of said clamp members together along both sides of the inner ends of the same, said bar members being arcuate and adapted to be positioned against inner ledges of the tire supporting rim, an arcuately shaped bar connecting said clamp members together at a point adjacent one edge of the tread of said pneumatic tire and transverse parallel ribs connected to said last named bar for extending over the tread of said tire with their opposite ends adapted to engage the opposite side wall of said tire.

4. A traction unit for use with a pneumatic tire of the type that has a peripheral tread portion and is mounted at its inner side on a tire supporting rim of an associated vehicle wheel, said unit consists of spaced generally horseshoe shaped spring clamp members for embracingly engaging about the tread and side walls of the tire, said clamp members having inwardly turned portions at each of their inner ends, bars connecting the inwardly turned portions of said clamp members together along both sides of the inner ends of the same, said bar members being arcuate and adapted to be positioned against inner ledges of the tire supporting rim, an arcuately shaped bar connecting said clamp members together at a point adjacent one edge of the tread of said pneumatic tire and transverse parallel ribs connected to said last named bar for extending over the tread of said tire with their opposite ends adapted to engage the opposite side wall of said tire, said transverse parallel ribs being in pairs with a loop connecting each pair at the end opposite said bar.

References Cited in the file of this patent

UNITED STATES PATENTS

| | | |
|---|---|---|
| 816,182 | Prouty | Mar. 27, 1906 |
| 924,806 | Lyon | June 15, 1909 |
| 2,290,398 | Wellington | July 21, 1942 |
| 2,625,193 | La Rocca | Jan. 13, 1953 |
| 2,651,347 | Gardetto | Sept. 8, 1953 |